(12) United States Patent
Leistra et al.

(10) Patent No.: US 8,057,847 B2
(45) Date of Patent: Nov. 15, 2011

(54) METHOD FOR PREPARING MEMBRANES AND MEMBRANE ELECTRODE ASSEMBLIES WITH HYDROGEN PEROXIDE DECOMPOSITION CATALYST

(75) Inventors: James A. Leistra, Simsbury, CT (US); Ned E. Cipollini, Enfield, CT (US); Wayde R. Schmidt, Pomfret Center, CT (US); Jared B. Hertzberg, Hyattsville, MD (US); Chi H. Paik, Manchester, CT (US); Thomas D. Jarvi, Manchester, CT (US); Timothy W. Patterson, East Hartford, CT (US); Sonia Tulyani, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 2417 days.

(21) Appl. No.: 10/698,659

(22) Filed: Oct. 31, 2003

(65) Prior Publication Data

US 2005/0095355 A1 May 5, 2005

(51) Int. Cl.
*B05D 5/12* (2006.01)
(52) U.S. Cl. .......................... 427/58; 427/115; 427/307
(58) Field of Classification Search .................. 427/58, 427/115, 307
See application file for complete search history.

(56) References Cited

U.S. PATENT DOCUMENTS

| | | | |
|---|---|---|---|
| 4,438,216 A | 3/1984 | Kampe et al. | |
| 5,342,494 A | 8/1994 | Shane et al. | |
| 5,472,799 A | 12/1995 | Watanabe | |
| 5,480,518 A | 1/1996 | Shane et al. | |
| 5,672,439 A | 9/1997 | Wilkinson et al. | |
| 5,795,669 A | 8/1998 | Wilkinson et al. | |
| 5,800,938 A | 9/1998 | Watanabe | |
| 5,874,182 A | 2/1999 | Wilkinson et al. | |
| 5,981,097 A * | 11/1999 | Rajendran | 429/33 |
| 6,309,769 B1 | 10/2001 | Haug | |
| 6,335,112 B1 | 1/2002 | Asukabe et al. | |
| 6,685,806 B1 * | 2/2004 | Cadaval Fernandez De Leceta et al. | 204/283 |
| 2003/0008196 A1 | 1/2003 | Wessel et al. | |
| 2003/0059664 A1 | 3/2003 | Menjak et al. | |

FOREIGN PATENT DOCUMENTS

| | | |
|---|---|---|
| EP | 0309337 | 3/1980 |
| GB | 1013703 | 12/1965 |
| JP | 07024315 A * | 1/1995 |
| JP | 2001-118591 | 4/2001 |

* cited by examiner

*Primary Examiner* — Elena T Lightfoot
(74) *Attorney, Agent, or Firm* — Bachman & LaPointe, P.C.

(57) ABSTRACT

A method for making a membrane electrode assembly includes the steps of providing a membrane electrode assembly including an anode including a hydrogen oxidation catalyst; a cathode; a membrane disposed between the anode and the cathode; and depositing a peroxide decomposition catalyst in at least one position selected from the group consisting of the anode, the cathode, a layer between the anode and the membrane and a layer between the cathode and the membrane wherein the peroxide decomposition catalyst has selectivity when exposed to hydrogen peroxide toward reactions which form benign products from the hydrogen peroxide. The peroxide decomposition catalyst can also be positioned within the membrane. Also disclosed is a power-generating fuel cell system including such a membrane electrode assembly, and a process for operating such a fuel cell system.

33 Claims, 3 Drawing Sheets

METHOD FOR PREPARING MEMBRANES AND MEMBRANE ELECTRODE ASSEMBLIES WITH HYDROGEN PEROXIDE DECOMPOSITION CATALYST

BACKGROUND OF THE INVENTION

The present invention relates to membrane electrode assemblies and, more particularly to such assemblies for fuel cells, especially for proton exchange membrane (PEM) fuel cells.

PEM fuel cells include a membrane electrode assembly (MEA) which typically includes an anode and cathode on either side of a membrane wherein fuel is fed to the anode, and oxygen to the cathode, and the resulting reaction generates electricity.

Unfortunately, current membrane technology produces stacks of cells including such membranes having useful lifetimes as short as about 1,000 hours which is well short of ultimate goals. When a membrane fails, failure occurs suddenly and ends the useful life of the cell, thereby necessitating immediate intervention. Cells can be excised from a stack for replacement, but will require great care and nevertheless will be accompanied by potential loss of adjacent cells. This type of replacement process is not a viable field service, and it is likely that once membrane failure begins, a stack replacement will be required.

It is clear that the need remains for membranes for fuel cell assemblies and the like which have longer useful lifetimes.

It is therefore the primary object of the present invention to provide a membrane electrode assembly having enhanced useful lifetime.

Other objects and advantages will appear hereinbelow.

SUMMARY OF THE INVENTION

In accordance with the present invention, the foregoing objects and advantages have been readily attained.

According to the invention, a method for making a membrane electrode assembly is provided which comprises the steps of providing a membrane electrode assembly comprising an anode including a hydrogen oxidation catalyst; a cathode; a membrane disposed between said anode and said cathode; and depositing a peroxide decomposition catalyst in at least one position selected from the group consisting of said anode, said cathode, a layer between said anode and said membrane, and a layer between said cathode and said membrane wherein said peroxide decomposition catalyst has selectivity when exposed to hydrogen peroxide toward reactions which form benign products from said hydrogen peroxide.

The method can be carried out ex-situ during the manufacture of the electrode or electrolyte assembly, or in-situ after manufacture of the fuel cell, and can be done so as to provide uniform and non-uniform distribution of the catalyst.

BRIEF DESCRIPTION OF THE DRAWINGS

A detailed description of preferred embodiments of the present invention follows, with reference to the attached drawings, wherein.

DETAILED DESCRIPTION

The invention relates to a method for preparing membranes and membrane electrode assemblies for PEM fuel cells wherein the membrane is provided with protection from attack by hydrogen peroxide decomposition products that can decompose or erode the cell membrane and reduce the life of the cell.

In accordance with the present invention, it has been found that the limitations on useful life of proton exchange membrane (PEM) fuel cells is often the useful life of the membrane. Over the lifetime of use of such membranes, it is found that the membranes are eroded until they fail. In accordance with the present invention, it has been found that this erosion is due to the harmful decomposition of hydrogen peroxide at or within the membrane, which generates radicals and other harmful products that decompose the membrane. In accordance with the present invention, such harmful products of decomposition of peroxides are avoided through incorporation of a peroxide decomposition catalyst in the membrane electrode assembly, and useful life of the membrane and cell containing same are extended. Various methods for incorporating the catalyst are provided, both in-situ, or post manufacture, and ex-situ, during manufacture of the membranes.

Figure 1:
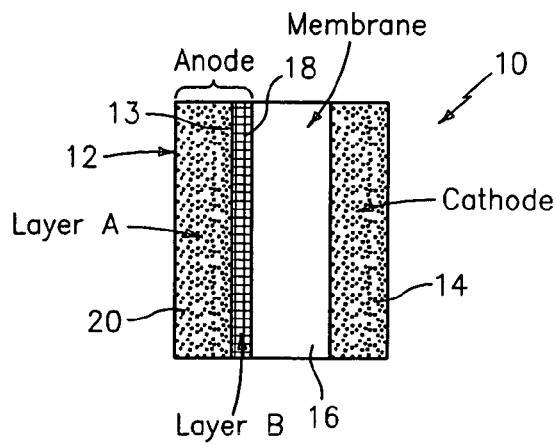
FIG. 1 illustrates a two-layer anode configuration of a membrane electrode assembly in accordance with the present invention.

FIG. 1 illustrates a portion of a fuel cell including a membrane electrode assembly (MEA) 10 in accordance with the present invention. MEA 10 includes an anode 12, a cathode 14 and a membrane 16 positioned therebetween. In normal operation of a fuel cell, a hydrogen-containing fuel is fed to anode 12, and an oxygen source is fed to cathode 14, and reactions occur which generate a potential across membrane 16 as desired.

In accordance with the present invention, it has also been found that hydrogen peroxide is frequently created at anode 12 by partial reduction of oxygen. At the anode potential, the surface of typical hydrogen oxidation catalyst positioned in the anode is such that oxygen which comes into contact with the catalyst in this position has a high chance of being reduced to hydrogen peroxide. Oxygen can come into contact with the anode catalyst through oxygen crossover or through an air-bleed intended to mitigate CO-poisoning, or through other mechanisms.

Hydrogen peroxide can decompose to benign products, for example water and oxygen. Under certain conditions, however, hydrogen peroxide decomposes to products which can be damaging to the membrane. For example, hydrogen peroxide can react with an impurity ion or high surface area particulate to generate a .OH radical, which can attack the polymer of the membrane. It is believed in accordance with the present invention that such radicals are formed when hydrogen peroxide reaches the membrane, and that such radicals are responsible for chemical erosion or consumption of the membrane.

In accordance with the present invention, a peroxide decomposition catalyst is incorporated into membrane electrode assembly 10 and is advantageously positioned to cause benign decomposition of hydrogen peroxide, preferably into water and oxygen. In accordance with the invention, the peroxide decomposition catalyst can be positioned in one or more locations including within the anode, within the cathode, within the membrane itself, as a layer between the anode and the membrane, as a layer between the cathode and the membrane and in combinations of these locations.

The peroxide decomposition catalyst in accordance with the present invention is preferably one selected to have activity toward benign decomposition of hydrogen peroxide. Benign decomposition is considered to be that which leads to products that are not harmful to the structure of membrane. Thus, benign decomposition includes that which decomposes hydrogen peroxide to form water and oxygen. Specific decomposition which is not considered benign, and which is prevented by the catalyst incorporation of the present invention, is decomposition of hydrogen peroxide to form radicals such as .OH and .OOH.

Peroxide decomposition catalysts in accordance with the present invention are preferably those which do not allow escape or generation of free radicals from hydrogen peroxide.

In accordance with the present invention, the peroxide decomposition catalyst can include conducting and non-conducting materials, preferably those which are electrochemically stable within a fuel cell environment. Preferably, the peroxide decomposition catalyst is an element or composition containing an element selected from the group consisting of Pt, Pd, Ir, C, Ag, Au, Rh, Ru, Os, Re, Sn, Si, Ti, Zr, Al, Hf, Ta, Nb, Ce and combinations thereof, preferably Pt, Pd, Ir, C, Ag, Au, Rh, Ru and combinations thereof. Such catalysts are further preferably provided on a support which may advantageously be selected from the group consisting of oxides of Ru, Sn, Si, Ti, Zr, Al, Hf, Ta, Nb, Ce, and Mn, as well as zeolites, carbon and mixtures thereof.

As used herein, a catalyst is considered to be within an electrode or the membrane when it is incorporated as a layer into the electrode or membrane, or is dispersed through the electrode or membrane, or both.

In accordance with one aspect of the present invention, peroxide decomposition catalyst is preferably positioned adjacent to the anode and/or cathode of a membrane electrode assembly so as to provide for benign decomposition of hydrogen peroxide. As used herein, the term "adjacent" includes physically adjacent positioning to, as well as positioning in electric communication with, the electrode.

In the embodiment illustrated in FIG. 1, peroxide decomposition catalyst is provided as a layer 18 positioned on a membrane-facing side or surface 13 of anode 12.

Still referring to FIG. 1, in this embodiment, anode 12 includes a first layer or layers 20 which typically includes hydrogen oxidation catalyst, and layer 18 containing the peroxide decomposition catalyst in accordance with the present invention. In this embodiment, layer 18 is adjacent to surface 13 of anode 12.

The hydrogen oxidation catalyst in layer 20 of anode 12 can be any catalyst having suitable activity or selectivity toward the desired reactions. Examples of suitable hydrogen oxidation catalyst include platinum and platinum-ruthenium catalyst, and this catalyst can preferably be supported on a suitable support such as carbon.

Other catalyst(s) can be incorporated into layer 18, along with the peroxide decomposition catalyst, so long as sufficient selectivity is provided in layer 18 to provide a desired level of benign destruction of hydrogen peroxide.

It may also be preferable that layer 18 be provided having a high ionomer content, preferably sufficiently high that this layer is substantially non-porous, having a porosity of less than about 20%. Layer 18 is further preferably relative thin, and is provided having a low volume fraction of catalyst so as to minimize ionic resistance due to the added layer.

Layers 18, 20 in one embodiment are preferably provided in electrical continuity, and such electrical continuity between these layers can greatly simplify manufacturing relative to an electrically insulated layer. Further, it is preferred to place layer 18 as close to anode 12 as possible since this interface between layers is where hydrogen peroxide is expected to most aggressively attack the membrane.

In accordance with the embodiment of FIG. 1, when membrane electrode assembly 10 is in operation, any hydrogen peroxide generated in anode 12, or at surface 13 or the interface between anode 12 and layer 18, is in the presence of peroxide decomposition catalyst in layer 18, and is broken down via benign pathways before entering membrane 16 as desired. This advantageously serves to extend the useful lifetime of membrane 16 within assembly 10, thereby enhancing product life as desired in accordance with the present invention.

Figure 2:
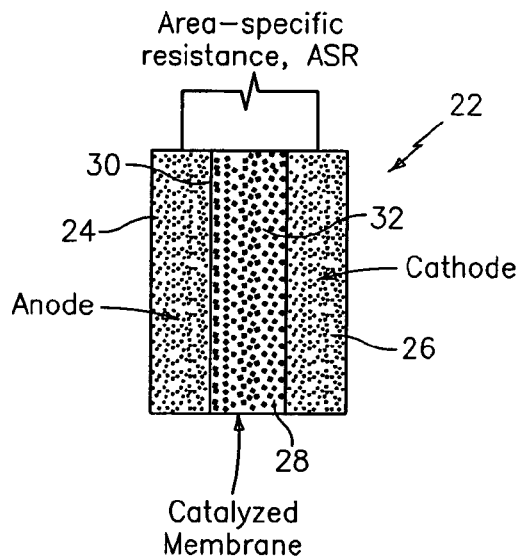
FIG. 2 illustrates a membrane electrode assembly in accordance with the present invention wherein the membrane contains catalyst.

Turning now to FIG. 2, an alternative embodiment of a membrane electrode assembly 22 in accordance with the present invention is illustrated. FIG. 2 shows membrane electrode assembly 22 having anode 24, cathode 26 and a catalyzed membrane 28 which contains the desired peroxide decomposition catalyst dispersed therethrough. This catalyst, in similar fashion to the layer embodiment of FIG. 1, advantageously serves to decompose hydrogen peroxide via benign pathways before the peroxide enters membrane 28 as desired. The catalyst may also serve as an oxygen reduction catalyst, and/or an additional oxygen reduction catalyst can be provided, and can be positioned in any of the positions mentioned above to consume oxygen before formation of peroxide, thereby assisting in preventing erosion of the membrane in accordance with the present invention. As set forth below, a particular location where the oxygen reduction catalyst may be desired is in a layer between the cathode and membrane.

In accordance with the embodiment of FIG. 2, it should be appreciated that catalyst disposed therethrough may or may not be electrically insulating. An insulating or non-conductive layer may result from properties of the particles of catalyst and/or the support, or may result in a conducting layer having a range of area-specific electronic resistance of between about 200 and about 2000 Ohm-cm$^2$. Such a range gives rise to a negligible parasitic current, on the order of 0.5-5 mA/cm$^2$. This configuration of catalyst serves to greatly simplify manufacturing and does not meaningfully impact upon cell performance.

In further accordance with the embodiment of FIG. 2, and as shown, it is preferred that the membrane be catalyzed throughout the entire membrane, including and up to a surface 30 facing anode 24 and a surface 32 facing cathode 26. This can be accomplished, for example, by dispersing catalyst through membrane 28 as illustrated. This advantageously provides membrane 28 with protection from hydrogen peroxide generated at either anode 24 or cathode 26. It is noted that normal operating conditions at cathode 26 do not lead to substantial generation of hydrogen peroxide. Nevertheless, even in trace amounts, such hydrogen peroxide can lead to substantial membrane decomposition over time, and the catalyzed membrane in accordance with this embodiment is protected from hydrogen peroxide from either anode 24 or cathode 26, as is desired in accordance with the present invention.

In the embodiment of FIG. 2, since a weak electronic connection between anode 24 and cathode 26 is tolerated, loading of catalyst in the membrane is less restricted than it would be if the catalyzed membrane were to be electrically isolated.

In accordance with a further embodiment of the invention (See FIG. 3), a membrane electrode assembly 34 is provided having an anode 36, a cathode 38 and a membrane 40 positioned therebetween. In this embodiment, in addition to the hydrogen oxidation catalyst positioned in anode 36 and the oxygen reduction catalyst which may be present in cathode 38, peroxide decomposition catalyst is advantageously dispersed through anode 36 and cathode 38 as well. Mixing of catalyst in the electrodes in accordance with this embodiment of the present invention can advantageously allow for positioning of peroxide decomposition catalyst as close as possible to the peroxide source, that is, the hydrogen oxidation and/or oxygen reduction catalyst. As set forth above, the need for peroxide decomposition catalyst in cathode 38 is generally reduced as compared to anode 36 since operating conditions in cathode 38 do not generally lead to the formation of hydrogen peroxide. Thus, peroxide decomposition catalyst is preferably present in the anode in an amount greater than that in the cathode.

Figure 3:
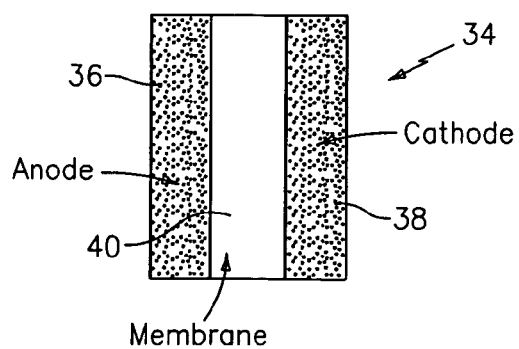
FIG. 3 illustrates a further embodiment of the present invention wherein catalyst is dispersed through the anode and cathode.

Of course, it should also be appreciated that the peroxide decomposition catalyst location as illustrated in each of FIGS. 1, 2 and 3 can be combined in other manners. Further, in connection with the embodiment of FIG. 1, peroxide decomposition catalyst can also be positioned in a layer between membrane 16 and cathode 14, if desired and/or necessary, as shown in FIG. 4.

Figure 4:
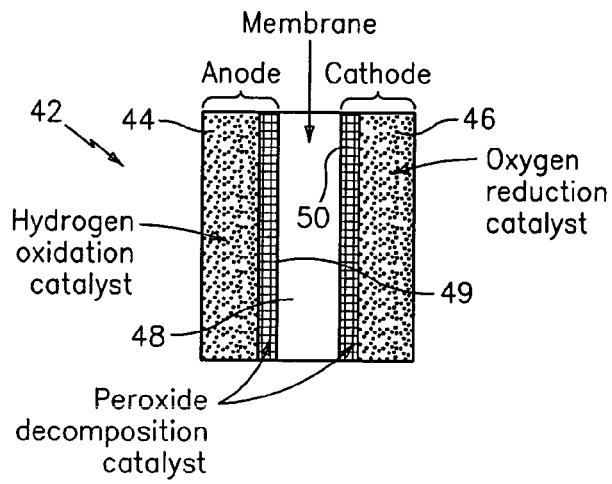
FIG. 4 illustrates an embodiment of the present invention wherein catalyst is provided in layers between the membrane and anode and between the membrane and cathode.

FIG. 4 illustrates a further membrane electrode assembly 42 in accordance with the present invention including anode 44, cathode 46 and membrane 48 disposed therebetween. In this embodiment, anode 44 includes hydrogen oxidation catalyst disposed therein, and cathode 46 includes oxygen reduction catalyst disposed therein, as is well known to a person of ordinary skill in the art. Further, in this embodiment, anode 44 includes a layer 49 containing peroxide decomposition catalyst in accordance with the present invention, and cathode 46 includes a layer 50 of peroxide decomposition catalyst and may also include an oxygen reduction catalyst to consume oxygen thereby preventing oxygen crossover as desired in accordance with the present invention. As described above, this embodiment advantageously serves to provide for benign decomposition of peroxide generated through either electrode of assembly 42 as desired in accordance with the present invention, and serves to enhance the useful lifetime of membrane 48.

Figure 5:
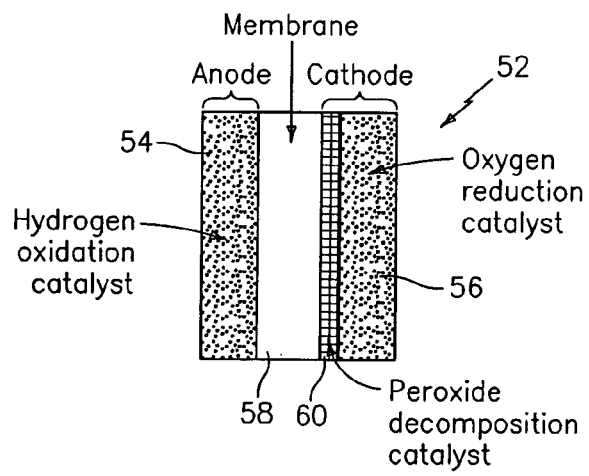
FIG. 5 illustrates a further embodiment of the present invention wherein catalyst is provided only in a layer between the cathode and membrane.

Turning now to FIG. 5, a further membrane electrode assembly 52 in accordance with the present invention is illustrated, which includes anode 54, cathode 56 and membrane 58 disposed therebetween. In this embodiment, cathode 56 includes a layer 60 of peroxide decomposition catalyst and may also include an oxygen reduction catalyst to consume oxygen thereby preventing oxygen crossover as desired, and this configuration may be desired when membrane electrode assembly 52 is to be operated in such a fashion that peroxide is expected to be generated within cathode 56.

Figure 6:
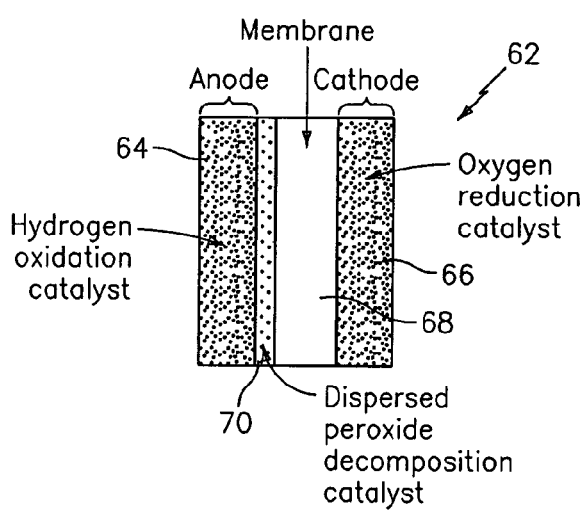
FIG. 6 illustrates an embodiment of the present invention wherein peroxide decomposition catalyst is provided in a dispersed layer between the membrane and anode.

Turning now to FIG. 6, still another embodiment of the present invention is illustrated. In this embodiment, peroxide decomposition catalyst is disposed in a separate layer by being dispersed through the layer. Thus, FIG. 6 shows a membrane electrode assembly 62 in accordance with the present invention including anode 64, cathode 66 and membrane 68 positioned therebetween. In this embodiment, however, a separate layer 70 is provided in the form of suitable peroxide decomposition catalyst dispersed through suitable layer material. For example, such a layer of catalyst can be disposed within the membrane by impregnation into the membrane material to a desired depth from either or both sides or surfaces of the membrane. In this embodiment, wherein electrical conductivity is not required, the catalyst density can advantageously be lower than in other configurations. It should of course be appreciated that FIG. 6 shows a configuration with a layer containing dispersed catalyst between the anode and membrane of the method. Such a dispersed catalyst layer can likewise be positioned between the cathode and the membrane if desired, either alone or in combination with the layer as illustrated in FIG. 6.

In order to provide maximum protection or shielding of the membrane from hydrogen peroxide, the intermixed anode and cathode of FIG. 3, containing peroxide decomposition catalyst, can be combined with two-layer electrodes of FIG. 1, for either the anode or the cathode or both, so as to decompose all potential sources of peroxide entering the membrane.

In further accordance with the present invention, it has also been found, advantageously, that the use of peroxide decomposition catalysts which are supported on oxides can be exploited to alter the water transfer characteristics of the anode and cathode, for example to make the anode more hydrophilic than the cathode.

As set forth above, various types of peroxide decomposition catalyst are desirable. It has been found that silver and gold particles are particularly advantageous at providing the desired peroxide decomposition, and such catalyst is particularly effective when deposited over carbon. Carbon itself is also a very useful peroxide decomposition catalyst. Of course, many other materials are also suitable for use as peroxide decomposition catalyst as described above.

In accordance with one embodiment of the present invention, the peroxide decomposition catalyst may be platinum, and in some instances may be the same as the hydrogen oxidation catalyst. In such embodiments, it is preferred that the peroxide decomposition catalyst be positioned in a dispersed form. The optimum Pt interparticle distance in this layer depends upon location and thickness within the space between the anode and cathode and thickness of the adjacent membrane, and is selected so as to promote benign decomposition of peroxide as desired.

In accordance with a further aspect of the present invention, the membrane electrode assembly can advantageously be provided with peroxide decomposition catalysts in the anode, membrane, cathode, layers between the anode and membrane, and/or layers between the cathode and the membrane, and when peroxide decomposition catalyst is so positioned, a particularly preferred group of peroxide decomposition catalyst includes elements or compositions containing elements selected from the group consisting of Pd, Ir, C, Ag, Au, Rh, Ru, Sn, Si, Ti, Zr, Al, Hf, Ta, Nb, Ce and combinations thereof, preferably Pd, Ir, C, Ag, Au, Rh, Ru and combinations thereof. This catalyst may further be supported on support as identified above.

Also as set forth above, the membrane electrode assembly described herein is particularly advantageous when utilized in a power-producing fuel cell system. In such a configuration, the electrode assembly is positioned in a stack of similar components, and the stack is fed with fuel that is preferably rich in hydrogen, as well as an oxidant or oxygen source. In addition to the well known reactions to generate power, this feeding of components to the fuel cell will also form hydrogen peroxide which, in accordance with the invention, is to be decomposed along benign pathways. In accordance with the present invention, the peroxide decomposition catalyst advantageously serves to decompose this hydrogen peroxide along benign pathways, preferably to generate water and oxygen, so that the membrane of the membrane electrode assembly is protected from attack by radicals or other harmful peroxide decomposition products, and membrane life is extended.

The electrode assembly of the present invention is referred to herein as a membrane electrode assembly. It should of course be appreciated that this term is intended to specifically include unitized electrode assemblies (UJEA) as well.

Figure 7:
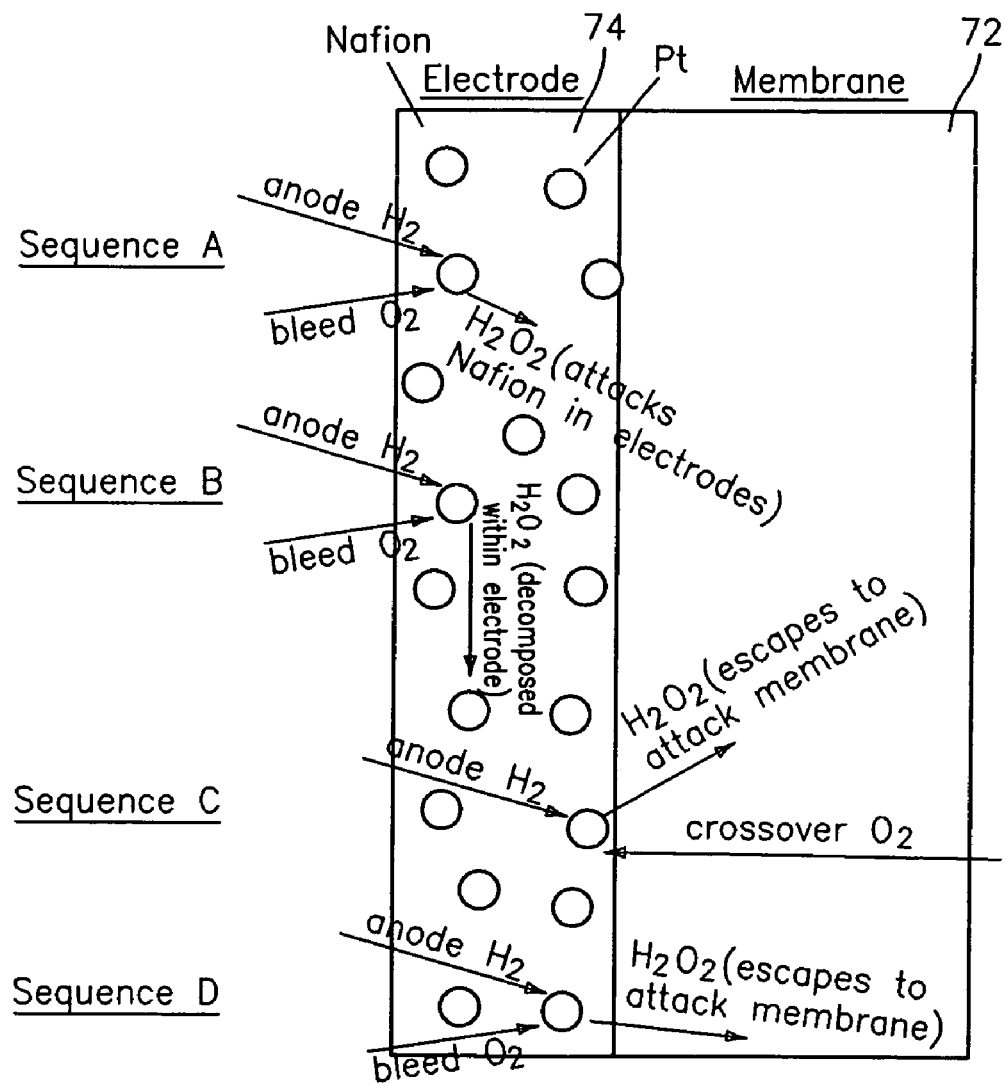
FIG. 7 schematically illustrates different reactions which occur during operation of a fuel cell containing a membrane electrode assembly, some of which may be harmful to the membrane.

FIG. 7 illustrates various reactions which occur and which can lead to problematic formation of hydrogen peroxide. FIG. 7 shows a portion of a membrane electrode assembly including a membrane 72, and an anode 74 containing platinum particles as hydrogen oxidation catalyst. FIG. 7 further shows various incoming anode hydrogen and bleed oxygen which in the presence of the platinum particles can generate hydrogen peroxide ($H_2O_2$). The reaction illustrated in sequence A could lead to attack of the actual electrode material. However, in practice, most if not all of such reactions are overcome by the reactions which take place as illustrated in sequence B of FIG. 7, wherein hydrogen peroxide is decomposed within the electrode. However, sequences C and D of FIG. 7 lead to generation of hydrogen peroxide in close proximity to membrane 72, and this leads to the undesirable probability of harmful decomposition of peroxide which is overcome in accordance with the present invention. In these two sequences, when hydrogen meets a platinum particle in close proximity to the membrane and oxygen, either coming from crossover oxygen as in sequence C or in the form of bleed oxygen as shown in sequence D, hydrogen peroxide is formed and can penetrate membrane 72, where decomposition into harmful products results in erosion or consumption of membrane 72.

Benign decomposition of hydrogen peroxide, which is promoted in accordance with the present invention, generally happens within the MEA, and occurs in accordance with the following reactions:

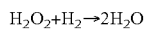

$$H_2O_2 + H_2 \rightarrow 2H_2O$$

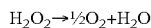

$$H_2O_2 \rightarrow \tfrac{1}{2}O_2 + H_2O$$

These benign reactions typically occur when hydrogen peroxide decomposes at low and high potentials, respectively, in the presence of platinum. In accordance with the present invention, it has been found that once hydrogen peroxide enters the membrane, in the presence of a species X, which may be an impurity ion ($X^{z+}$), the following reaction occurs instead:

$$H_2O_2 + X^{z+} \rightarrow .OH^- + X^{(z+1)+} + .OH$$

The .OH radical can attack the polymer, or can recombine into hydrogen peroxide, and can further react with hydrogen peroxide to generate other radicals such as .OOH. It is believed that the radicals then attack the membrane, causing consumption or erosion of same. It is further believed that this process is accelerated under dry conditions.

Positioning of peroxide decomposition catalysts as set forth in the present invention serves to produce the benign decomposition of such hydrogen peroxide into oxygen and water as desired above, and to avoid decomposition of hydrogen peroxide in the presence of any species or impurities of the membrane which lead to radical formation and damage to the membrane.

In accordance with the present invention, various methods have been provided for adding hydrogen peroxide decomposition catalyst in a controlled and flexible manner to fuel cell membrane electrode assemblies. The methods of the present invention are adapted to provide uniform as well as non-uniform or layered structures. Further, these methods are adapted to be carried out ex-situ, wherein the decomposition catalyst is added during manufacture of the membrane, and in-situ, wherein the decomposition catalyst is added to the membrane after membrane electrode assembly manufacture.

These methods are further described hereinbelow.

The ex-situ methods include methods for providing uniform distribution of the catalyst as well as methods for providing non-uniform or layered manufacture.

In order to provide uniform catalyst distribution, the solid catalyst, supported catalyst particles or catalyst precursor may be calendared or mixed with the membrane material, for example with the fluorosulfonate form of the ionomer, and the mixture can then be extruded. Alternatively, the solid catalyst, supported catalyst particles or catalyst precursor can be mixed with solvent and the fluorosulfonate form of the ionomer and cast into a film, followed by a hydrolyzing step.

Still further, solid catalyst, supported catalyst particles or catalyst precursors can be dispersed in a solution of ionomer and solvent, and the resulting mixture can be cast into the membrane.

In a further method for providing the membrane in accordance with the present invention, the membrane can be swelled in alcohol, and catalyst, supported catalyst particles or catalyst precursor can then be inserted into the swelled membrane.

In each of these embodiments, it should be appreciated that the catalyst size can be reduced through various methods including milling, high shear mixing, or ultrasonication. Further, the catalyst can initially be blended with a low concentration of ionomer, for example less than or equal to about 25% of the total intended amount, and then additional ionomer can be added so as to cast the resulting layer or membrane.

As set forth above, the solid catalyst, catalyst particles and/or catalyst precursor can advantageously include an element selected from the group consisting of Pt, Pd, Ir, C, Ag, Au, Rh, Ru, Os, Re, Sn, Si, Ti, Zr, Al, Hf, Ta, Nb, Ce and combinations thereof.

In further accordance with the invention, the catalyst as set forth above can be supported on any suitable support which may preferably be selected from the group consisting of oxides of Ru, Sn, Si, Ti, Zr, Al, Hf, Ta, Nb, Ce, Mn, zeolite, carbon and combinations thereof.

In accordance with an alternative embodiment of the invention, the catalyst may advantageously be selected from the group consisting of oxides of Ru, Sn, Si, Ti, Zr, Al, Hf, Ta, Nb, Ce, Mn, zeolite, carbon and combinations thereof.

In further accordance with the present invention, the catalyst can be provided and mixed into solution or otherwise provided in the membrane material as a catalyst precursor, which may typically be an organometallic, metal hydroxide, or metal salt, all of which are later reduced or oxidized as required, either ex-situ or in-situ, or both, to form the catalyst.

In accordance with a further embodiment of the present invention, metal decomposition catalysts can be added to the membrane through the ion exchange process. For example, an ion exchange membrane can be conditioned by exchanging hydrogen ions with replacement cations to swell the membrane. Then, the replacement cations can be exchanged or replaced with catalyst cations. The catalyst cations are then reduced to metallic atoms or particles, and the conditioning, exchanging and reducing steps can repeated at least once to form a multiply-impregnated membrane.

Any remaining cations in the membrane can then be exchanged with hydrogen cations. Equilibration of the membrane then results in the metal being present in the form of discrete and isolated particles as desired.

In accordance with the invention, the ion exchange membrane can advantageously comprise fluorocarbon, hydrocarbon, and partially-fluorinated hydrocarbon membrane.

In still further accordance with this invention, the catalyst may typically comprise an element selected from the group consisting of Pd, Ir, C, Ag, Au, Rh, Ru, Os, Re, Sn, Si, Ti, Zr, Al, Hf, Ta, Nb, Ce and combinations thereof.

U.S. Pat. Nos. 5,342,494, and 5,480,518 are drawn to methods for making a platinum metal catalyst impregnated fluorocarbon ion exchange membrane, and these patents are incorporated herein, in their entirety, by reference.

As an alternative to the methods disclosed in these patents, the starting membrane can be provided in the K form, which thereby eliminates a step from the methods disclosed in the aforesaid patents which were incorporated by reference.

Further, reduction of catalyst cations can occur in-situ, rather than during manufacture of the membrane.

Finally, the exchange to be carried out can occur with a membrane electrode assembly (MEA) instead of merely a membrane.

In further accordance with the invention, ex-situ methods can be used to provide membranes and membrane electrode assemblies having non-uniform or layered portions thereof.

This can be accomplished through extrusion of layers followed by lamination. For example, a catalyst such as Au can be mixed with ionomer and cast or extruded onto a membrane. This catalyst layer would have high proton conductivity and low gas permeability to differentiate this layer from the electrode.

Layers can also be produced one on top of the other by doctor blading, screening, printing, gravure coating, spraying, soft lithographic rubber stamping, thermal spraying, spin coating/casting, and the like.

Further, deposits may graded, or proportionally incorporated into the membrane, by platinizing and reducing with borohydride from one side only of the membrane, using, for example, a method such as that disclosed in the above-identified patents which were incorporated by reference.

Deposits may also be graded by platinizing from one side and reducing from the other side simultaneously.

Still further, partial swell of the existing membrane using different solvents on each side can be utilized to grade porosity, and such a step can be followed by filling in with the appropriate catalyst.

Chemical vapor deposition techniques can be utilized in ex-situ methods for depositing the metallic atoms on or into the membrane as desired. In addition, chemical vapor deposition, absorption or coating processes can be utilized to deposit metallic atoms on structural reinforcements for the membrane, followed by traditional membrane manufacturing process such as coating the reinforcement with ionomer.

Islands or specific regions of catalyst can be deposited at specific locations, if desired, using complex solvent delivery followed by solvent phase separation, typically involving key parameters such as time, solubility, temperature, atmosphere and the like. This type of delivery may be desirable to create layers such as is shown in FIGS. 1, 4, 5 and 6.

Another method for manufacturing the desired membrane involves chemical fluid deposition, utilizing a supercritical fluid to deposit an organometallic material onto a substrate or porous surface. This organometallic material or precursor can be reduced to the desired metal by the use of hydrogen gas or other reducing agent. For example, supercritical $CO_2$ can be used to deposit Pd, Pt, Ag and Rh for example, on porous alumina. This can be done for example at a temperature of about 60° C. By tailoring flow conditions of opposing streams, the location of the catalyst layer can be precisely positioned. This advantageously allows for deposit of catalyst into a PEM membrane utilizing various methods, including deposit of the catalyst onto a porous EPTFE support, followed by casting nafion or other ionomer onto the support; by deposit of the catalyst onto high surface-area nafion pellets, followed by heating and pressing of the pellets to form a non-porous membrane; preparation of a high surface-area porous nafion membrane followed by deposit of the catalyst into the porous membrane, heating and pressing the porous material to provide an impermeable membrane, and the like. In addition, these methods can also be used to manufacture porous nafion/catalyst electrodes as desired.

It should be clear that the foregoing presents a wide range of alternatives for use in the ex-situ manufacture of a membrane such as a PEM membrane, and MEA including same, including desired catalyst either uniformly or non-uniformly distributed through or relative to the membrane.

As set forth above, in-situ methods are also provided in accordance with the present invention for incorporating catalyst into the membrane after manufacture of the membrane and/or MEA.

In such an in-situ method, the anode and/or cathode potentials of the system can be cycled, with feed reactants or an external power source, to allow platinum to dissolve from the electrode layer. This platinum recrystallizes within the membrane. It has been found that platinum loss in the cathode by potential cycling results in acceptable performance loss and electrochemical area, for example, an $H_2$ air performance loss up to 20 mV at 100 and 1000 $mA/cm^2$, respectively, and 10 $m_2/g$ ECA loss after 1000 thirty second pulses to +1.1 V RHE (reference hydrogen electrode).

While such a method advantageously allows for distribution of platinum into the membrane as desired, the impact of such a process can be minimized by fabricating a membrane electrode assembly or MEA with an electrode layer that contains some excess platinum content as a sacrificial source of platinum to migrate into the membrane.

Either potential or reactant cycling can be used to drive the platinum from the electrodes into the membrane. These methods involve procedures to platinize the membrane by potential or reactant cycling. Such procedures can be performed within the stack, and without additional high-cost manufacturing processes, so as to advantageously provide the desired membrane including platinum or other catalyst as desired.

Another method whereby platinum can be migrated into the membrane is through the use of external gases. Platinum can migrate into the membrane from electrodes when experience high dissolution potentials which exposed to different reactant gases. For example, the cell can be exposed to inert conditions or gases such as hydrogen-hydrogen or hydrogen-nitrogen environments, and then quickly be switched, for example within approximately 60 seconds, to a hydrogen-air and air-air system, and then returned to the inert conditions. The repetition of this gas exposure to hydrogen to air or oxygen can cause the electrode to experience high potential excursions, resulting in dissolution of platinum out of the electrode layer. Furthermore, exposure to hydrogen-air can create a driving force for dissolved platinum ions to migrate into the membrane as desired, in addition to the diffusion transport. One preferred cycling in accordance with the present invention is to expose the electrode to a cycle from hydrogen to nitrogen to air to nitrogen and to hydrogen. The reactant gas exposure period can be between about 10 and about 600 seconds, and the repetition can be carried out for as many as 4000 cycles. As with the process identified above, it may be desirable to provide electrodes with excess platinum as a sacrificial source to allow for migration into the membrane.

Another in-situ method whereby platinum or other catalyst can be driven into the membrane is through application of high potentials, for example up to about +1.2 v, by either a cyclic or pulsed potential profile. Substantially homogenous distribution of platinum can be obtained within the membrane by optimizing the potential cycling at a potential specified from +0.04 to +1.4 V vs. RHE, and a time of application can be between about 0.001 and about 0.1 V/s. If the potential is to be pulsed, the potential can be cycled from +0.04 to +1.4 V vs. RHE with a time width varying from 5 to 150 second intervals, for up to about 10,000 pulses. This cycling can be performed on a platinum or platinum/carbon catalyst layer on both the anode and cathode to ensure uniform distribution throughout the membrane. This process will typically be more effective when performed on the anode because peroxide attack occurs near the vicinity of the anode, and the impact of performance is minimal when platinum is lost in the anode. Thus, protection can be provided utilizing this method where protection is most needed, and where the lost platinum is least critical.

This method can be utilized with a cell temperature ranging between about 25 and about 65° C. It is preferable to cycle at a lower temperature, for example less than about 40° C., to minimize sintering effects, and maintain minimal particle sizes in the membrane. The gases used in this process should be inert gases, for example nitrogen or helium, for the electrode from which platinum is being dissolved. Dilute hydrogen, for example 4% hydrogen and nitrogen, can advantageously be used on the opposing electrode.

In further accordance with the invention, an addition supply of platinum can be provided or stored in the catalyst layer and/or in an embedded layer in the membrane to replenish the platinum which migrates into the membrane. In this method, during preparation of the membrane electrode assembly, platinum loading can be increased from 0.4 to about 0.6 mg/cm$^2$. An enriched layer within the catalyst layer can be used in which a heavier platinum loading is placed near the electrode-membrane interface. Such a procedure can be incorporated utilizing a two step coating process of heavier platinum loading onto the membrane, followed by a lighter loading on the outer coating. Because peroxide is generated at the anode, the process may be more effective if implemented at the anode than the cathode. The thickness, placement and density of the enriched layer can be tailored so that, upon undergoing potential cycling, it will produce a uniform density of platinum in the membrane. Such a distribution is most effective in decomposing peroxide, although other distributions may be desirable.

A high-density platinum layer may preferably be embedded in the membrane, separated from the electrode by a layer of nafion. Since platinum passivates at approximately +1.2 V vs. RHE, but is highly soluble at lower potentials at 1-1.1V, then holding of the working electrode at +1.2 V results in the embedded layer experiencing a lower potential and, therefore will dissolve. This can be utilized to distribute platinum as desired through the membrane while the working electrode is protected and remains intact.

It should be appreciated that the present invention provides a wide range of hydrogen peroxide decomposition catalyst into the ion exchange membrane utilizing a wide range of ex-situ and in-situ methods. The present invention advantageously allows longer life membranes in fuel cell applications, through low cost manufacturing procedures, with simplicity of manufacture and provision of small particle size. In addition, the methods of the present invention allow uniform and/or specifically tailored non-uniform distributions of the hydrogen peroxide decomposition catalyst, which can advantageously be utilized to meet the needs of a particular situation.

It should be appreciated that the present invention provides for membrane protection from peroxide decomposition products that can attack the membrane, thus reducing erosion of the membrane and increasing the useful life of the membrane as desired.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A method for making membrane electrode assembly, comprising the steps of:
   providing a membrane electrode assembly comprising an anode including a hydrogen oxidation catalyst; a cathode; and a membrane disposed between said anode and said cathode; and
   depositing a peroxide decomposition catalyst in at least one position selected from the group consisting of a layer between said anode and said membrane and a layer between said cathode and said membrane, wherein said peroxide decomposition catalyst has selectivity when exposed to hydrogen peroxide toward reactions which form benign products from said hydrogen peroxide, and wherein said layer has a porosity of less than or equal to 20% and is less porous than said anode and said cathode.

2. The method of claim 1, wherein said peroxide decomposition catalyst comprises an element selected from the group consisting of Pt, Pd, Ir, C, Ag, Au, Rh, Ru, Os, Re, Sn, Si, Ti, Zr, Al, Hf, Ta, Nb, Ce and combinations thereof.

3. The method of claim 2, wherein said peroxide decomposition catalyst comprises an element selected from the group consisting of Pt, Pd, Ir, C, Ag, Au, Rh, Ru and combinations thereof.

4. The method of claim 2, wherein said peroxide decomposition catalyst is supported on a support selected from the group consisting of oxides of Ru, Sn, Si, Ti, Zr, Al, Hf, Ta, Nb and Ce, Mn, zeolites, carbon and combinations thereof.

5. The method of claim 1, further comprising the step of depositing an oxygen reduction catalyst in at least one position of said group of positions.

6. The method of claim 5, wherein said oxygen reduction catalyst is selected from the group consisting of oxides of Ru, Sn, Si, Ti, Zr, Al, Hf, Ta, Nb and Ce, Mn, zeolites, carbon and combinations thereof.

7. The method of claim 5, wherein said oxygen reduction catalyst is positioned in a layer between said cathode and said membrane.

8. The method of claim 1, wherein said peroxide decomposition catalyst comprises an element selected from the group consisting of Ag, Au, C and combinations thereof.

9. The method of claim 8, wherein said peroxide decomposition catalyst is supported on carbon.

10. The method of claim 1, wherein said peroxide decomposition catalyst is carbon.

11. The method of claim 1, wherein said peroxide decomposition catalyst is deposited as said layer disposed between said anode and said membrane.

12. The method of claim 11, wherein said layer is electrically connected to said anode.

13. The method of claim 11, further comprising the step of depositing a layer of said peroxide decomposition catalyst between said membrane and said cathode.

14. The method of claim 11, wherein said layer further comprises a portion of said hydrogen oxidation catalyst.

15. The method of claim 1, wherein said peroxide decomposition catalyst is also deposited in said membrane.

16. The method of claim 15, wherein said depositing step comprises impregnating said peroxide decomposition catalyst into said membrane from a surface of said membrane to a desired depth into said membrane.

17. The method of claim 15, wherein said membrane has an anode surface and a cathode surface and wherein said peroxide decomposition catalyst is deposited in said membrane at said anode surface and said cathode surface whereby peroxide generated at either of said anode and said cathode is decomposed in the presence of said peroxide decomposition catalyst.

18. The method of claim 1, wherein said peroxide decomposition catalyst is deposited adjacent to said anode.

19. A method for making a membrane electrode assembly, comprising the steps of:
providing a membrane electrode assembly comprising an anode including a hydrogen oxidation catalyst; a cathode; and a membrane disposed between said anode and said cathode; and
depositing a peroxide decomposition catalyst in at least one position selected from the group consisting of a layer between said anode and said membrane and a layer between said cathode and said membrane, wherein said peroxide decomposition catalyst has selectivity when exposed to hydrogen peroxide toward reactions which form benign products from said hydrogen peroxide, wherein said layer has a porosity of less than or equal to 20% and is less porous than said anode and said cathode, and wherein said peroxide decomposition catalyst comprises an element selected from the group consisting of Pd, Ir, C, Ag, Au, Rh, Ru, Os, Re, Sn, Si, Ti, Zr, Al, Hf, Ta, Nb, Ce and combinations thereof.

20. The method of claim 19, wherein said peroxide decomposition catalyst comprises an element selected from the group consisting of Pd, Ir, C, Ag, Au, Rh, Ru and combinations thereof.

21. The method of claim 19, wherein said peroxide decomposition catalyst comprises an element selected from the group consisting of Ag, Au, C, and combinations thereof.

22. The method of claim 19, wherein said peroxide decomposition catalyst is supported on a support selected from the group consisting of oxides of Ru, Sn, Si, Ti, Zr, Al, Hf, Ta, Nb, and Ce, Mn, zeolites, carbon and combinations thereof.

23. The method of claim 1 or 19, wherein said depositing step is carried out ex-situ.

24. The method of claim 23, wherein said depositing step comprises mixing said hydrogen peroxide decomposition catalyst with an ionomer to provide a mixture, and forming said mixture into said membrane having said hydrogen peroxide decomposition catalyst disposed therethrough.

25. The method of claim 23, wherein said depositing step comprises swelling said membrane in alcohol to provide a swelled membrane; and inserting said catalyst into said swelled membrane.

26. The method of claim 23, further comprising the steps of depositing said catalyst as a catalyst precursor, and reducing said catalyst precursor to form said catalyst.

27. The method of claim 23, wherein said depositing step comprises impregnating said membrane with said catalyst.

28. The method of claim 23, wherein said depositing step is carried out so as to provide a substantially uniform distribution of said catalyst through said membrane.

29. The method of claim 23, wherein said depositing step is carried out so as to provide a substantially non-uniform distribution of said catalyst relative to said membrane.

30. The method of claim 29, wherein said depositing step comprises forming a plurality of layers at least one of which contains said catalyst, and laminating said layers together.

31. The method of claim 19, further comprising the step of depositing an oxygen reduction catalyst in at least one position of said group of positions.

32. The method of claims 31, wherein said oxygen reduction catalyst is selected from the group consisting of oxides of Ru, Sn, Si, Ti, Zr, Al, Hf, Ta, Nb and Ce, Mn, zeolites, carbon and combinations thereof.

33. The method of claim 1 or claim 19, wherein said depositing step is carried out in-situ.

* * * * *